2,786,818

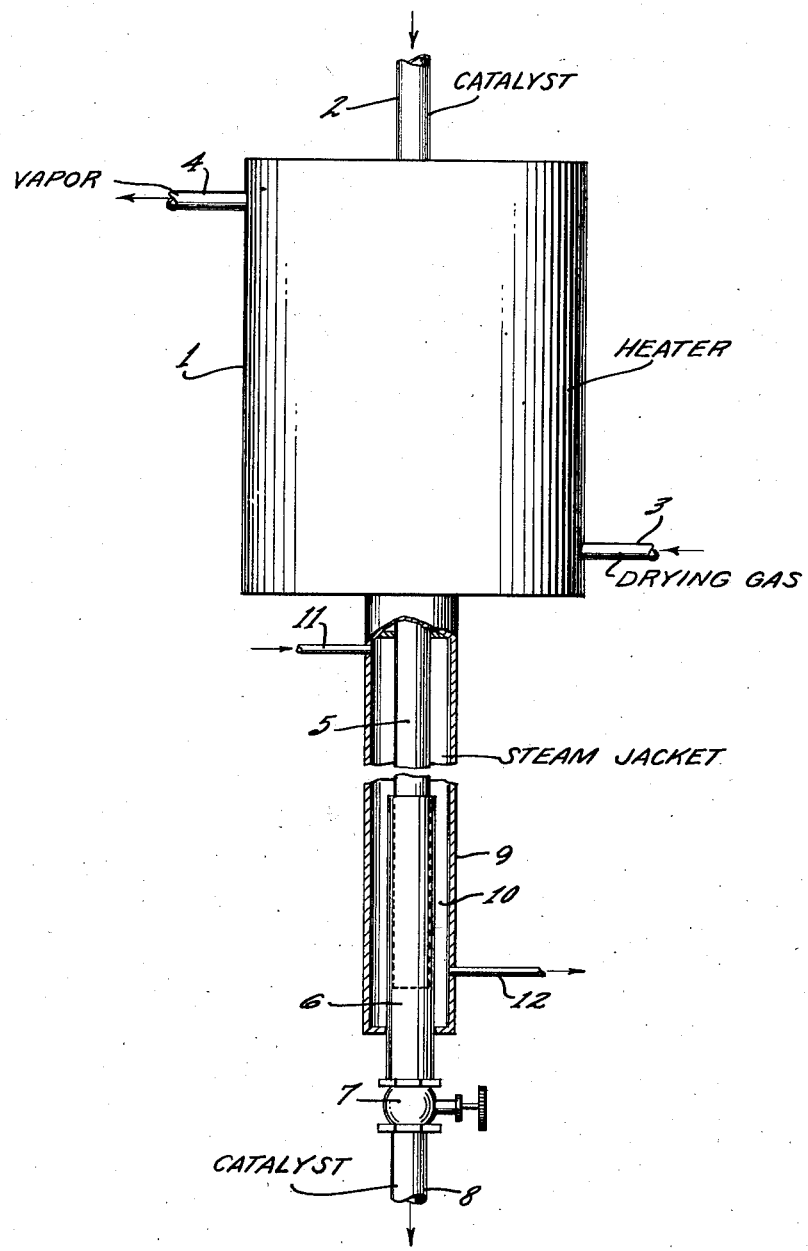

METHOD FOR TREATING HYDROGELS

Hubert A. Shabaker, Media, Pa., assignor to Houdry Process Corporation, Wilmington, Del., a corporation of Delaware Application December 23, 1952, Serial No. 327,549

4 Claims. (Cl. 252—448)

The present invention relates to the manufacture of inorganic oxide gels in the form of spheroidal beads or pellets of other desired shape, particularly of the type employed as contact masses in the catalytic conversion of hydrocarbons.

Such catalyst beads or pellets are commonly prepared by introducing gelable hydrosol into a water-immiscible liquid wherein the masses of hydrosol set to form beads or pellets of hydrogel. Immediately upon formation of the hydrogel a transformation begins to take place, as a consequence of which the gel becomes less hydrous and undergoes various other changes in its characteristics. Such transformation may occur gradually, simply by letting the hydrogel stand at room temperature for a substantial period of time, or it may be accelerated by elevating the temperature. The transformation that takes place during this period is commonly referred to as "aging."

The matter of aging the beads in the process of manufacture is of considerable importance, inasmuch as the properties and characteristics which render the final product specially suitable as a catalytic contact mass depend in large measure upon successful aging. Aging can occur at any time the gel is in a wet state, that is at any time prior to its reaching a state of substantial dryness.

A method for preparing hydrogel beads or pellets of the type referred to herein is disclosed in application, Serial No. 187,500, for Bead Forming Process, filed September 29, 1950, in the name of Edward H. Lebeis, now Patent No. 2,665,258. That application discloses a process involving a partial-drying stage, the control of which is of vital importance with respect to any aging that may occur in this stage. In the partial-drying stage the drying is effected at a constant rate, since the evaporation of water takes place only at the surface of the bead. The drying rate will remain constant until the plane of vaporization begins to recede into the interior of the bead, after which the drying rate will vary directly with the moisture content.

Major transformations, occuring as a result of aging, are observed to take place during the preliminary or early stages of any drying step. For example, the beads shrink to a fraction of their original volume and are increased considerably in hardness, while in general still retaining the shape assumed during their formation.

Aging of the hydrogel fixes the density of the final product, the final density being in general an inverse function of aging. That is, the more drastic the aging, the lower the final bead density. In addition to the extent of aging, the uniformity of aging is of considerable importance. Non-uniform aging may produce beads of widely different densities, with substantial variation in physical structure, which is undesirable from the standpoint of physical and catalytic considerations.

It has been found that for optimum conditioning of the beads partial drying should be stopped while the beads are still in the constant-rate drying period, and while the water content from bead to bead is as nearly uniform as possible. Also, that careful handling of the beads in the partial drying apparatus is necessary, because the freshly prepared beads are weak and are subject to breakage as a result of crushing, or of bouncing when permitted to fall freely.

In my copending application for Method and Apparatus for Drying Hydrogels, filed concurrently herewith as application, Serial No. 327,550, now Patent No. 2,717,458, I have disclosed an improved method and apparatus for effecting the constant-rate drying of freshly prepared hydrogel beads. The drier illustrated therein as an embodiment of the invention provides cross-flow drying over the exposed surfaces of continuously moving, shallow compact masses of beads, with frequent mixing of the beads. Such continuous movement of the beads is effected by passing them downwardly as a nested plurality of confined zig-zag streams, with mixing of the beads at the ends of each sloping run of the zig-zag paths. The partially dried beads are discharged downwardly as an elongated compact moving column from each path of the drier. There are no moving parts of the drier contacting the beads at any time, and the beads are not permitted to fall freely during any portion of their descent through the drier.

The present invention is particularly concerned with such aging of the beads as may occur subsequent to the partial-drying operation, that is, the operation in the manufacturing process wherein the beads are undergoing constant-rate drying.

In accordance with the present invention hydrogel beads or pellets which have been partially dried in a constant-rate drier, with consequent partial aging, are immediately thereafter further aged to a desired degree of completion by being passed directly from the constant-rate partial-drying zone to and through an aging zone wherein the beads are maintained at substantially the same conditions of temperature and humidity as existed at the time of their withdrawal from the partial drying zone. Within the aging zone the temperature and the equilibrium moisture content of the beads is maintained substantially constant for a time sufficient to effect the desired additional aging, which additional aging is carried out without additional drying, that is, in the absence of drying gas. The time of residence of the beads within the aging zone is controlled by varying the volume or capacity of the aging zone, thereby permitting the rate of flow of the beads through both the partial drying zone and the aging zone to be maintained constant and controllable by varying the rate of withdrawal from the aging zone.

In accordance with a preferred embodiment of the invention, hydrogel beads which have been passed downwardly through a drier, in which the beads are repeatedly mixed while being contacted with a current of hot drying gas to effect a partial drying of the beads, are withdrawn therefrom through an elongated draw-off leg comprising telescoping conduit sections adjustably connected to provide a confined draw-off path of variable volume, so that the residence time of the beads therein may be controlled at will by adjustment of the volume. An adjustable valve at the bottom of the draw-off leg controls the rate of flow of the beads through the aging zone and the drier. In order to maintain the beads within the draw-off leg in substantially the same condition as they were when they left the drying zone, the draw-off leg is provided with heating element, such as a steam jacket or other suitable means, for maintaining the temperature of the beads within the draw-off leg at any desired level.

For a fuller understanding of the invention reference may be had to the following description and claims, taken in connection with the accompanying drawing forming a part of this application, in which the single figure of the drawing shows a diagrammatical representation of a drier adapted to effect a constant-rate partial drying of the beads, associated with an adjustable draw-off leg comprising an aging zone wherein the desired aging of the beads is carried to the desired degree of completion under controlled conditions of temperature and humidity.

Referring to the drawing, the numeral 1 represents a drier, which may be of the type illustrated and described in my aforesaid copending application, Serial No. 327,550, filed December 23, 1952, now Patent No. 2,717,458, or which may be of any other type suitable to effect a uniform partial drying of the beads. While my copending application shows a drier adapted to handle a plurality of separate gravitating catalyst streams, each provided with its own draw-off leg, for the purpose of simplification the illustrated embodiment of the present invention is shown with but one draw-off leg, it being understood that more than one may be provided or that the several streams within the drier may be combined upon withdrawal to discharge as a single compact moving column.

The hydrogel beads, which may be silica-alumina beads, are introduced into the upper end of drier 1 through an inlet conduit 2 connected to a hopper or other means for supplying newly-formed hydrogel beads which have set sufficiently to permit their being handled in the drier without excessive breakage.

Drying gas at elevated temperature is supplied through inlet conduit 3 to the lower end of the drier 1 and, together with the moisture removed from the beads, is discharged from the upper end of the drier through outlet conduit 4. It is to be understood, of course, that the invention is not limited to any particular manner of introducing and removing the drying gas, or of contacting the beads with the drying gas within the drier. Preferably, however, the drier is of a type in which the beads are conveyed in shallow-bed formation, with frequent mixing of the beads, while the drying gas is directed over the exposed surfaces of the beads. Since the drier per se forms no part of this invention, description and illustration of the internal structure of the drier is not considered essential for an understanding of the invention, and is therefore omitted. It suffices to say that the beads reach the lowermost region of drier 1 in a partially dry state, drying having been carried out nearly to completion of the constant-rate drying period. Typically the beads may be at a temperature of about 150–200° F. and at a moisture content of about 75–300 wt. percent on the washed dry basis.

The beads are withdrawn from the drying zone of chamber 1 before both aging and constant-rate drying have been completed. The beads pass downwardly as a compact moving column through a draw-off leg comprising an upper vertical tubular conduit 5, having its upper end adapted to receive the beads from the lower region of the drying chamber, and a lower tubular conduit 6 telescopically receiving within its upper end the lower end of conduit 5 and being longitudinally adjustable in relation thereto so as to provide a variable volume for the draw-off leg as a whole.

The draw-off leg is provided with a suitable valve 7 at its lower end in order to control the rate of catalyst flow through the drier. After discharging through valve 7 the partially dried, aged catalyst is conveyed, as by conduit 8, to the next stage in the process of manufacture, which may, for example, be a base exchange and washing step, preliminary to final drying and heat treating.

As the catalyst descends within the draw-off leg, or final aging zone, its temperature is maintained substantially constant by indirect heat exchange with a fluid, such as steam, circulating through a cylindrical jacket member 9 surrounding the draw-off leg. The heat exchange fluid is supplied to the jacket chamber 10 through inlet line 11, and is discharged from the chamber through outlet line 12.

By my invention I am enabled to partially dry the hydrogel beads almost to completion of their constant-rate drying period and to deliver the beads, without substantial change in the degree of dryness or in the temperature attained in achieving such degree of dryness, to an aging zone through which the beads are passed without substantial change of either temperature or degree of dryness until the desired amount of aging is completed. The method of my invention has the advantage of enabling the beads to be aged to the desired degree of completion after their removal from the drying zone, without the need for reheating the beads and without the danger of condensation of steam on them.

*Example 1*

Silica-alumina hydrogel beads are prepared as follows: streams of commercial water glass (N-Brand sodium silicate) are admixed with aluminum sulfate and sulfuric acid in a rotating, jet-type mixing head to give a pH of 8.5 and a weight ratio of 93 silica to 7 alumina, the product concentration being 100 grams of $SiO_2$ plus $Al_2O_3$ per liter of total solution. The resulting hydrosol is discharged into a bath of light machine oil wherein the hydrosol stream forms into and sets as hydrogel globules. The formed globules or beads are picked up below the oil bath by a conveying stream of dilute aqueous sodium sulfate (5% $Na_2SO_4$) and discharged onto a screen to remove the conveying liquid.

The hydrogel beads, thus freed of liquid, are then subjected to partial drying by continuous passage through a drier for 12 minutes operating at 200° F. dry bulb—140° F. wet bulb temperature, whereby the moisture content of the beads is reduced to approximately 200% by weight (105° C. dry basis).

The thus partially-dried beads are continuously discharged from the partial drying zone into an aging zone therebelow, arranged to pass the beads through at a rate which will give a residence time of 1 hour. The aging zone is maintained at a temperature of 138° F.

The hydrogel beads, partially dried and aged in accordance with the invention as described above, are then subjected to further conditioning treatment to produce the final product. The aged beads, upon removal from the aging zone, are cooled carefully, then subjected to washing and base exchange followed by final washing, and then subjected to final drying by conventional drying means. Such further treatment may comprise, for example, five 1-hour distilled water washes, then five 2-hour aluminum sulphate solution treatments, followed by twenty 1-hour water washes to remove the sulphate. Final drying may then be effected by subjecting the beads to a temperature of 250° F. dry bulb—212° F. wet bulb for a period of 1½ hours.

While, for the purpose of illustration, I have shown the desired aging as being accomplished in a telescoping tubular draw-off leg of variable volume, it will be apparent to those skilled in the art that such aging may be carried out in a chamber of any desired configuration, provided substantial uniformity of solids flow and uniformity of temperature and moisture conditions are assured throughout the horizontal cross-sectional area of the aging zone or chamber. Furthermore, it is contemplated that other suitable means for providing a variable volume of beads in the draw-off leg may be used. For example, instead of telescoping the separate sections of the draw-off leg, different discharge levels may be provided at the lower end portion thereof.

Obviously many modifications and variations of the invention as hereinbefore set forth may be made without departing from the spirit and scope thereof, and therefore only such limitations should be imposed as are indicated in the appended claims.

What is claimed is:

1. In a continuous process for treating preformed particles of silica-alumina hydrogel having a moisture content up to about 300% by weight to condition the same for use as a contact material, the improvement which comprises introducing the wet hydrogel particles into a flowing stream of drying gas having a temperature of about 150° to 200° F. for a time sufficient to reduce the moisture content of said particles to about 200%, passing the partially dried hydrogel particles through an aging zone maintained at about 138° F. during a time interval of about one hour, and then washing and drying the aged particles.

2. A process as defined in claim 1 in which the partial drying of said hydrogel particles form a moisture content of up to about 300% to a moisture content of about 200% is effected by subjecting said particles to a constant-rate partial drying treatment by continuous contact with said drying gas at a temperature of about 200° F. during a time interval of about 12 minutes.

3. A process as defined in claim 1, wherein said treatment is carried out in separate superimposed confined zones while said particles are gravitating as a continuous compact moving stream whose rate of flow is controlled at the point of discharge from the lower confined zone, and wherein said lower zone is adjustable as to volume, whereby the flow rate of said particles may be set to provide a desired residence time in the upper zone and the volume of the lower zone adjusted to provide therein the necessary residence time for the particles to complete the desired aging.

4. A process as defined in claim 3, wherein said lower zone is heated by indirect heat exchange to maintain the particles passing therethrough substantially at the temperature at which they were discharged from said upper zone.

References Cited in the file of this patent

UNITED STATES PATENTS

| | | |
|---|---|---|
| 1,762,228 | Holmes | June 10, 1930 |
| 2,509,014 | Payne et al. | May 23, 1950 |
| 2,558,206 | Baird | June 26, 1951 |